United States Patent
Caenazzo et al.

(10) Patent No.: US 8,037,780 B2
(45) Date of Patent: Oct. 18, 2011

(54) DISCRETE-RATIO GEARBOX FOR MOTOR VEHICLE

(75) Inventors: Dario Caenazzo, Orbassano (IT);
Gianluigi Pregnolato, Orbassano (IT);
Valter Pastorello, Orbassano (IT);
Carlo Emilio Baret, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 983 days.

(21) Appl. No.: 11/952,565

(22) Filed: Dec. 7, 2007

(65) Prior Publication Data

US 2008/0134825 A1  Jun. 12, 2008

(30) Foreign Application Priority Data

Dec. 11, 2006  (EP) .................................... 06425825

(51) Int. Cl.
*B60K 20/00* (2006.01)
*F16H 63/32* (2006.01)
*F16H 59/04* (2006.01)

(52) U.S. Cl. .................................. 74/473.37; 74/473.36

(58) Field of Classification Search ................. 74/473.1, 74/473.36, 473.37, 335, 606 R, 339
See application file for complete search history.

(56) References Cited

U.S. PATENT DOCUMENTS

| | | | | |
|---|---|---|---|---|
| 2,962,914 A * | 12/1960 | Peras | ........................ | 74/473.26 |
| 4,441,378 A * | 4/1984 | Ponczek | ........................ | 74/414 |
| 4,529,080 A * | 7/1985 | Dolan | ........................ | 192/109 A |
| 4,793,202 A * | 12/1988 | Okubo | ........................ | 74/473.37 |
| 6,450,057 B1 * | 9/2002 | Winkler et al. | ........................ | 74/473.37 |
| 6,619,153 B2 * | 9/2003 | Smith et al. | ........................ | 74/473.37 |
| 6,845,685 B2 * | 1/2005 | Brandwitte et al. | ........................ | 74/473.25 |
| 7,441,477 B2 * | 10/2008 | Ho | ........................ | 74/473.37 |
| 2007/0209466 A1 * | 9/2007 | Garabello et al. | ........................ | 74/473.37 |
| 2009/0107279 A1 * | 4/2009 | Garabello et al. | ........................ | 74/473.37 |
| 2009/0114050 A1 * | 5/2009 | Garabello et al. | ........................ | 74/473.37 |

FOREIGN PATENT DOCUMENTS

| | | |
|---|---|---|
| DE | 199 21 625 A1 | 11/2000 |
| DE | 199 24 275 A1 | 11/2000 |
| DE | 199 40 733 A1 | 3/2001 |
| DE | 100 49 245 A1 | 4/2002 |
| EP | 1 128 097 A2 | 8/2001 |
| EP | 1 832 786 A1 | 9/2007 |
| JP | 59-108125 A | 6/1984 |

\* cited by examiner

*Primary Examiner* — Justin Krause
(74) *Attorney, Agent, or Firm* — Sughrue Mion, PLLC

(57) ABSTRACT

The gearbox comprises a case, a rod mounted on the case, a pair of sliding shift forks mounted on the rod, and travel-limit elements arranged on the rod for defining travel-limit positions for the shift forks. The travel-limit elements comprise a pair of bushes which are separate from the rod and have each a first axially outer larger-diameter portion and a second axially inner smaller-diameter portion so as to define at least one axial abutment surface for the shift fork adjacent thereto.

12 Claims, 4 Drawing Sheets

DISCRETE-RATIO GEARBOX FOR MOTOR VEHICLE

BACKGROUND OF THE INVENTION

The present invention relates to a discrete-ratio gearbox for motor vehicle.

In conventional discrete-ratio gearboxes for motor vehicles, the shift travel limits of the various gear ratios are defined by the gear shift mechanisms themselves and therefore axial movements of the abutment surfaces defining the shift travel limits for the respective gear ratios, which are due to imperfect flatness and perpendicularity of the abutment surfaces and to the taking-up of axial play during the reversal of the axial thrust between drive and release because of the helical teeth of the gear wheels that define the gear trains associated with the various gear ratios, are transmitted to the respective sliding engagement sleeves, then to the respective shift forks and finally to the gear-change lever, thereby causing this latter to vibrate.

SUMMARY OF THE INVENTION

It is therefore the object of the invention is to prevent the production of vibrations in the gear-change lever as a result of the transmission of the axial vibrations from the sliding engagement sleeves to the shift forks of the gearbox.

This and other objects are achieved in full according to the invention by means of a discrete-ratio gearbox having the characteristics defined in Claim 1.

Further advantageous characteristics of the invention are specified in the dependent claims.

BRIEF DESCRIPTION OF THE DRAWINGS

The characteristics and the advantages of the invention will become clear from the following detailed description, given purely by way of non-limiting example with reference to the appended drawings, in which.

Figure 1:
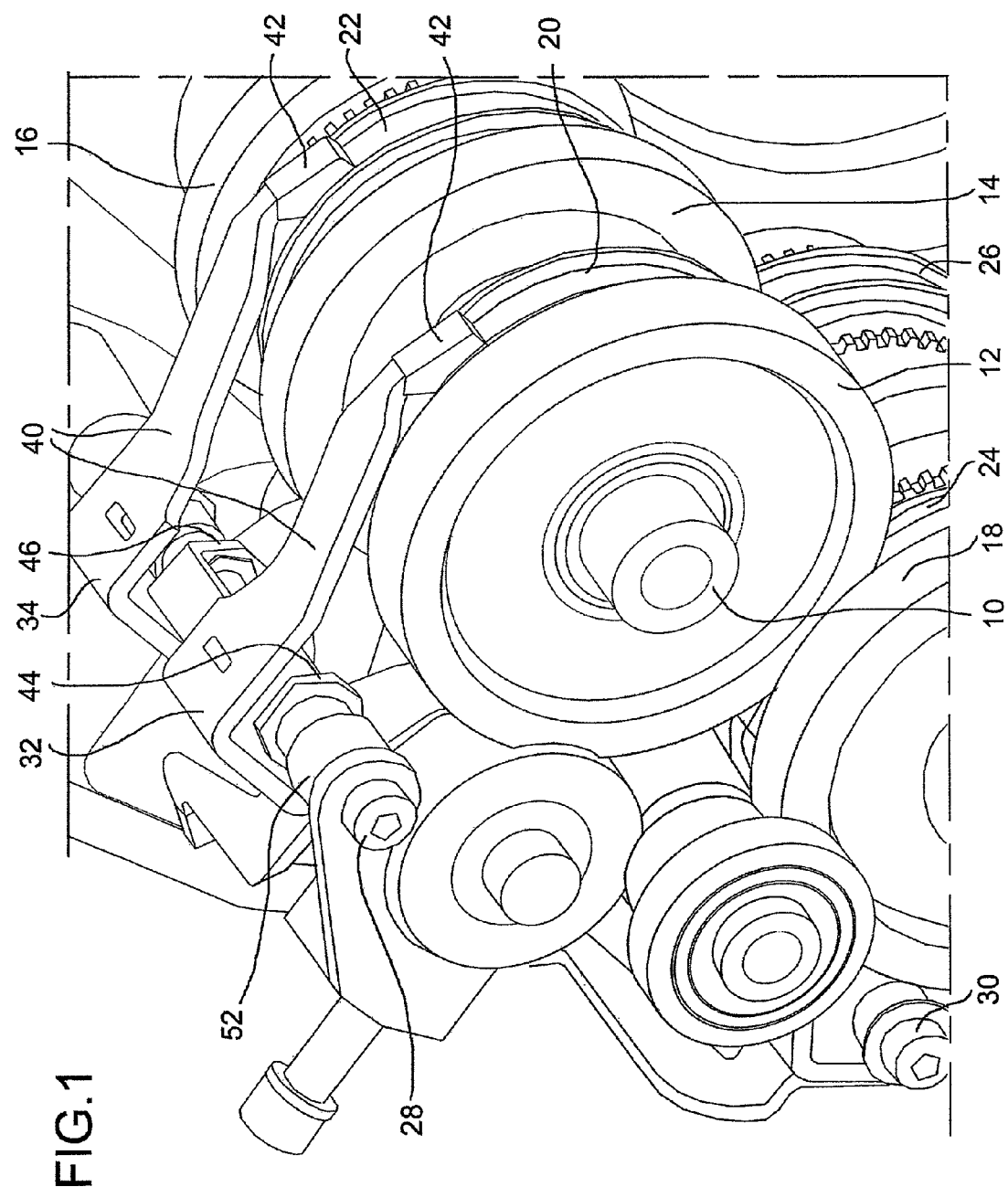
FIG. 1 is a perspective view which shows partially a discrete-ratio gearbox for motor vehicle according to a first preferred embodiment of the invention.

In the following description, the terms "left" and "right" refer, on each occasion, to the viewpoint of a person looking at the drawing in question and are used purely to facilitate understanding of what is illustrated in that drawing. They should not therefore be understood as in any way limiting.

Moreover, the following description will explain in detail the only gear shift mechanism, or rather that only part of the gear shift mechanism which comprises the shift forks and the rods on which the shift forks are mounted, without describing further constructional details of the gearbox relating, for example, to the number of input and output shafts or to the arrangement of the gears. The basic idea of the invention is in fact applicable to any discrete-ratio gearbox, irrespective of the number of input and output shafts and of the arrangement of the gears.

DETAILED DESCRIPTION OF THE PREFERRED EMBODIMENTS

Figure 2:
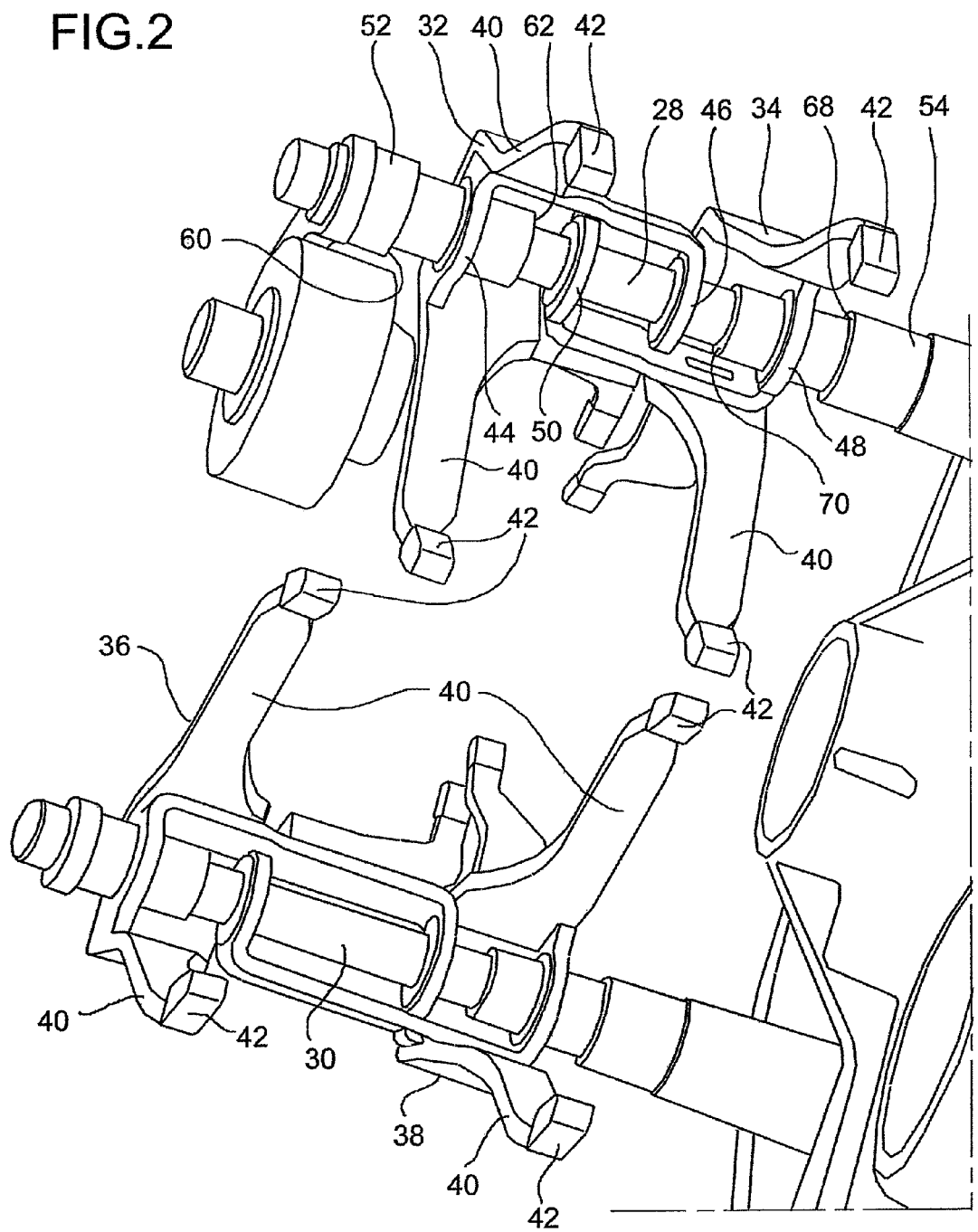
FIG. 2 is a perspective view which shows the set of shift forks of the gearbox of FIG. 1.
Figure 3:
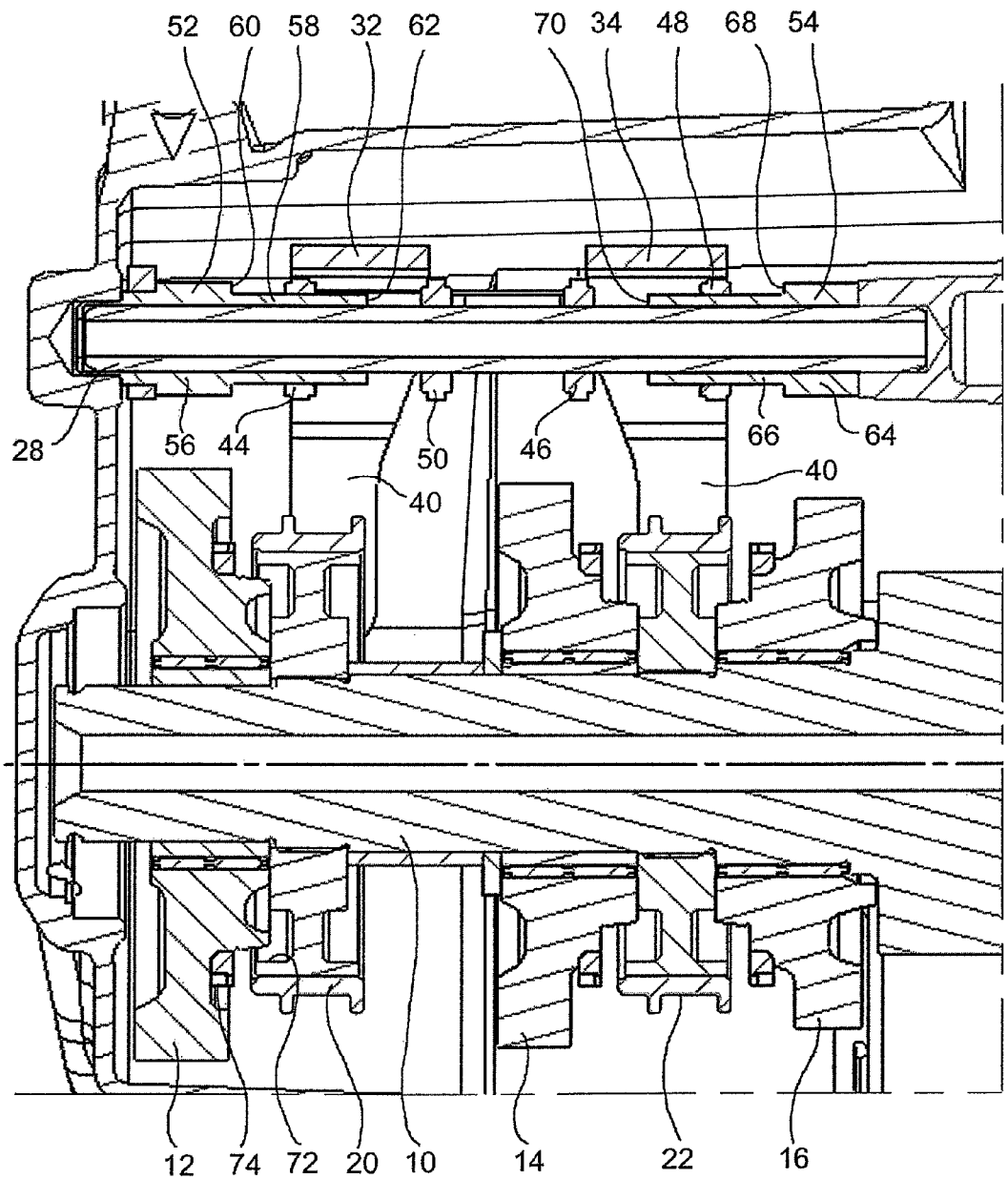
FIG. 3 is an axial section view which shows schematically a pair of shift forks arranged on the same rod in the gearbox of FIG. 1.

With reference first to FIGS. 1 to 3, a discrete-ratio gearbox for motor vehicle according to the present invention comprises at least one output shaft (the illustrated embodiment comprises two output shafts, only one of which is visible in the drawings and is indicated 10) carrying idle gear wheels 12, 14, 16 and 18 each associated with a respective gear ratio, sliding engagement sleeves 20, 22, 24 and 26, and at least one rod (two rods 28 and 30 in the illustrated embodiment) which is parallel to the axis of the output shaft and on which sliding shift forks 32, 34, 36 and 38, each associated with a respective sliding engagement sleeve, are mounted. In particular, in the illustrated embodiment, a first pair of shift forks 32 and 34 is mounted on the first rod 28 and a second pair of shift forks 36 and 38 is mounted on the second rod 30. Each shift fork comprises, in per-se-known manner, a sheet-metal body forming a pair of prongs and a pair of guide portions. Each prong (indicated by reference numeral 40 for all of the forks) has a finger-like end (indicated by reference numeral 42 for all of the forks) for operating the sliding engagement sleeve associated with that fork. Each guide portion of the fork has a hole through which the fork is guided along the respective rod.

According to the embodiment shown in FIGS. 1 to 3, the shift forks 32, 34, 36 and 38 are constructed as described in EP 1 832 786 in the Applicant's name. Basically, these forks are configured so that they can be mounted in pairs on the same rod in a partially overlapping arrangement. More specifically, the shift fork 32 has a first guide portion 44 which is disposed in the vicinity of the prongs 40 and a second guide portion 46 which is disposed farther from the prongs 40 than the first guide portion 44. Likewise, the shift fork 34 has a first guide portion 48 which is disposed in the vicinity of the prongs 40 and a second guide portion 50 which is disposed farther from the prongs 40 than the first guide portion 48. In the mounted condition, the guide portion 46 of the shift fork 32 is interposed between the two guide portions 48 and 50 of the other shift fork 34 and, likewise, the guide portion 50 of the shift fork 34 is interposed between the two guide portions 44 and 46 of the shift fork 32.

For simplicity, the guide portions of the two forks 36 and 38 that are mounted on the second rod 30 are not marked with reference numerals in the drawings and will not be described in detail. Naturally, however, the description given in connection with the first pair of shift forks 32 and 34 should be considered also to apply to the second pair of shift forks 36 and 38.

According to the invention, each rod carries travel-limit elements which are preferably constructed in the form of bushes and form axial abutment surfaces for the shift forks, each abutment surface being arranged to stop a respective shift fork in a given travel-limit position. With reference to FIGS. 2 and 3 in particular, the rod 28 carries a first travel-limit bush 52 mounted on the left-hand end of the rod to define the left-hand travel-limit position of the shift movement for each of the two shift forks 32 and 34 mounted on that rod, and a second travel-limit bush 54 mounted on the right-hand end of the rod to define the right-hand travel-limit position of the shift movement for each of the two shift forks 32 and 34 mounted on that rod.

Each of the two travel-limit bushes 52 and 54 is preferably constructed as a dual-diameter bush so as to form a first axial abutment surface for one shift fork and a second axial abutment surface for the other shift fork. More specifically, the first travel-limit bush 52 (the left-hand bush) has a first larger-diameter portion 56 disposed towards the axially outer side of the rod 28 and a second smaller-diameter portion 58 disposed towards the axially inner side of the rod 28. The bush 52 thus forms a first axially outer axial abutment surface 60 for cooperating with the guide portion 44 of the first shift fork 32 to define the left-hand travel-limit position of that fork, and a second axially inner axial abutment surface 62 for cooperating with the guide portion 50 of the second shift fork 34 to define the left-hand travel-limit position of that fork. Likewise, the second travel-limit bush 54 (the right-hand bush) has a first larger-diameter portion 64 disposed towards the axially outer side of the rod 28 and a second smaller-diameter portion 66 disposed towards the axially inner side of the rod 28. The bush 54 thus forms a first axially outer axial abutment surface 68 for cooperating with the guide portion 48 of the second shift fork 34 to define the right-hand travel-limit position of this fork, and a second axially inner axial abutment surface 70 for cooperating with the guide portion 46 of the first shift fork 32 to define the right-hand travel-limit position of this fork.

For a better understanding of the function of the travel-limit bushes, let us consider a gear shift manoeuvre involving the movement towards the left of the shift fork 32 and of the associated engagement sleeve 20 therewith, in order to couple the idle gear wheel 12 for rotation with the output shaft 10. The travel-limit position of the movement of the fork 32 towards the left is defined by the axially outer abutment surface 60 of the travel-limit bush 52. This position corresponds to the condition of meshing between an engagement toothing 72 on the engagement sleeve 20 and a corresponding engagement toothing 74 on the idle gear wheel 12 (FIG. 3). Once this condition has been reached, the engagement toothing 72 of the engagement sleeve 20 is uncoupled from the annular portion of the same sleeve on which the finger-like end 42 of the shift fork 32 acts, owing to the axial thrust resulting from the tangential traction force and from the typical shape of the toothings 72 and 74. A complete uncoupling is thus achieved between the shift fork and the gear-shift lever, on the one hand, and the idle gear wheel and the engagement toothing of the engagement sleeve, on the other hand, such an uncoupling being permitted by the adequate play that exists between the finger-like ends 42 of the fork and the annular portion of the sleeve. This clearly makes it possible to avoid the transmission of annoying vibrations to the gear-shift lever.

The two travel-limit bushes 52 and 54 may be made of any suitable metal (typically steel) or plastics material, since they are separate parts with respect to the gearbox which is generally made of aluminium. The dual-diameter configuration of the travel-limit bushes advantageously allows the reaction surface on the gear case to be increased.

The travel-limit bushes 52 and 54 are preferably identical to one another so as to reduce the number of different components of the gearbox. In this connection, it should be noted that, in the embodiment shown in FIG. 3, the engagement sleeve 20 associated with the shift fork 32 is arranged to couple only the idle gear wheel 12 to the output shaft 10 by movement towards the left. Therefore, an axial abutment surface defining the right-hand travel-limit position would not be necessary for the shift fork 32 and the right-hand travel-limit bush 54 could then have only one diameter instead of a pair of portions with different diameters. Nevertheless, just in order to reduce the number of different components of the gearbox, two identical dual-diameter bushes are preferably used.

A further advantage of the invention is that the use of travel-limit elements that are arranged on the rod (or on the rods) along which the shift forks slide, rather than on the gear-shift lever or in the kinematic chain between the gear-shift lever and the shift forks, enables tolerances to be reduced and thus ensures greater precision in defining the shift travel-limit positions.

Figure 4:
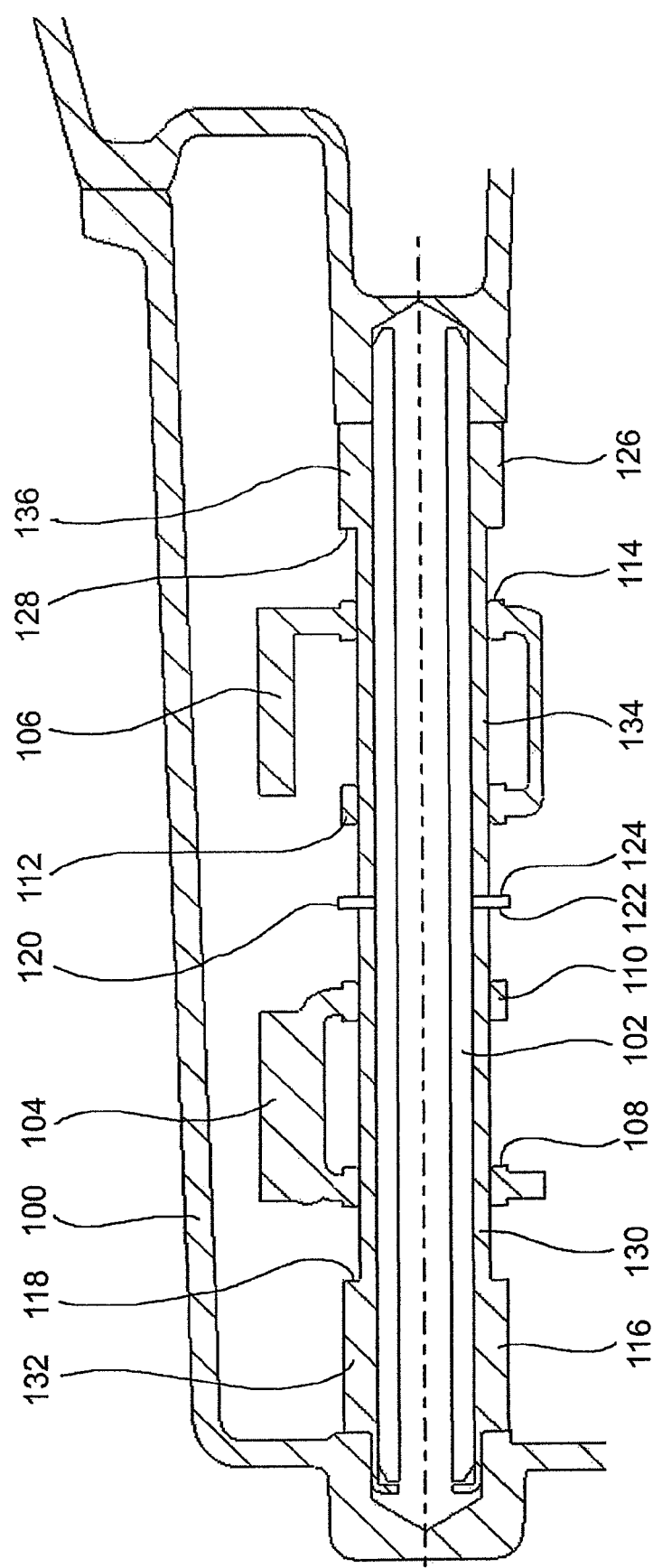
FIG. 4 is an axial section view which shows schematically a pair of shift forks arranged on a rod in a discrete-ratio gearbox for motor vehicle according to a variant of the present invention.

The invention is also applicable to gearboxes having non-overlapping shift forks. As shown in FIG. 4, according to a variant of the invention, a discrete-ratio gearbox for motor vehicle, of which only a gear case 100 is shown, comprises a rod 102 on which a first shift fork 104 and a second shift fork 106 are slidably mounted, each shift fork being arranged to operate a respective sliding engagement sleeve (not shown). The first shift fork 104 forms a pair of guide portions, that is, a left-hand guide portion 108 and a right-hand guide portion 110, and the second shift fork 106 forms a pair of guide portions, that is, a left-hand guide portion 112 and a right-hand guide portion 114. The rod 102 has a first travel-limit element 116 disposed on the left-hand end of the rod and forming an axial abutment surface 118 cooperating with the left-hand guide portion 108 of the first shift fork 104, a second travel-limit element 120 disposed in the axially central region of the rod and forming a pair of axial abutment surfaces 122 and 124 cooperating with the right-hand guide portion 110 of the first shift fork 104 and with the left-hand guide portion 112 of the second shift fork 106, respectively, and a third travel-limit element 126 disposed on the right-hand end of the rod and forming an axial abutment surface 128 cooperating with the right-hand guide portion 114 of the second shift fork 106. Also in this case, the travel-limit elements 116 and 126 forming the axially outer abutment surfaces 118 and 128 are constructed as dual-diameter bushes. In particular, the left-hand travel-limit element 116 comprises a smaller-diameter portion 130 on which the first fork 104 is slidably mounted, and a larger-diameter portion 132 forming the abutment surface 118. Likewise, the right-hand travel-limit element 126 comprises a smaller-diameter portion 134 on which the second fork 106 is slidably mounted, and a larger-diameter portion 136 forming the abutment surface 128. In the illustrated example of construction, the intermediate travel-limit element 120 is formed instead by a retaining ring.

Also in this case, the two bushes 116 and 126 may be made of a material different from that of the gear case 100 and may be identical to one another so as to provide the same advantages as indicated above with reference to the embodiment of FIGS. 1 to 3.

Naturally, the principle of the invention remaining unchanged, embodiments and details of construction may be varied widely with respect to those described and illustrated purely by way of non-limiting example.

What is claimed is:

1. A discrete-ratio gearbox for a motor vehicle, comprising a case, at least one rod mounted on the case, at least one sliding shift fork mounted on the at least one rod, and travel-limit means which are provided on the at least one rod for defining travel-limit positions for the at least one shift fork, wherein the travel-limit means comprise at least one bush separate from the at least one rod, wherein the at least one bush is fixedly mounted on a respective end of the at least one rod and comprises an axially inner portion and an axially outer portion which is formed in a single piece with the axially inner portion and has a larger diameter than the axially inner portion.

2. A gearbox according to claim 1, wherein the at least one shift fork is slidably mounted on the axially inner portion and wherein the axially outer portion forms an axial abutment surface defining a travel-limit position for the at least one shift fork.

3. A gearbox according to claim 2, comprising a left-hand shift fork and a right-hand shift fork which are mounted on a common rod, a left-hand bush, a right-hand bush, and a third travel-limit element interposed between the left-hand and right-hand bushes, wherein the axial abutment surface of the left-hand bush defines a travel-limit position for the movement of the left-hand shift fork to the left, wherein the axial abutment surface of the right-hand bush defines a travel-limit position for the movement of the right-hand shift fork to the right, and wherein the third travel-limit element forms a pair of axial abutment surfaces defining a travel-limit position for the movement of the left-hand shift fork to the right and a travel-limit position for the movement of the right-hand shift fork to the left, respectively.

4. A gearbox according to claim 3, wherein the third travel-limit element is a retaining ring.

5. A gearbox according to claim 1, wherein the axially inner portion forms a first axial abutment surface defining a travel-limit position for a first shift fork and wherein the axially outer portion forms a second axial abutment surface defining a travel-limit position for a second shift fork.

6. A gearbox according to claim 5, comprising a left-hand shift fork and a right-hand shift fork which are mounted on a common rod, as well as a left-hand bush and a right-hand bush each having said first axial abutment surface and said second axial abutment surface, wherein the first axial abutment surface of the left-hand bush defines the left-hand travel-limit position for the right-hand shift fork and the second axial abutment surface of the left-hand bush defines the left-hand travel-limit position for the left-hand shift fork, and wherein the first axial abutment surface of the right-hand bush defines the right-hand travel-limit position for the left-hand shift fork and the second axial abutment surface of the right-hand bush defines the right-hand travel-limit position for the right-hand shift fork.

7. A gearbox according to claim 6, wherein each of the left-hand and right-hand shift forks comprises a first axially outer guide portion and a second axially inner guide portion, and wherein the axially inner guide portion of each shift fork is interposed between the guide portions of the other shift fork.

8. A gearbox according to claim 1, wherein the at least one bush is made of a material different from that of the case.

9. A gearbox according to claim 3, wherein the left-hand and right-hand bushes are identical to one another.

10. A gearbox according to claim 6, wherein the left-hand and right-hand bushes are identical to one another.

11. A discrete-ratio gearbox for a motor vehicle, comprising a case, at least one rod mounted on the case, at least one sliding shift fork mounted on the at least one rod, and travel-limit means which are provided on the at least one rod for defining travel-limit positions for the at least one shift fork,
- wherein the travel-limit means comprise at least one bush separate from the at least one rod,
- wherein the at least one bush is fixedly mounted on a respective end of the at least one rod and comprises an axially inner portion and an axially outer portion having a larger diameter than the axially inner portion,
- wherein the at least one shift fork is slidably mounted on the axially inner portion and wherein the axially outer portion forms an axial abutment surface defining a travel-limit position for the at least one shift fork,
- wherein the gearbox further comprises a left-hand shift fork and a right-hand shift fork which are mounted on a common rod, a left-hand bush, a right-hand bush, and a third travel-limit element interposed between the left-hand and right-hand bushes,
- wherein the axial abutment surface of the left-hand bush defines a travel-limit position for the movement of the left-hand shift fork to the left,
- wherein the axial abutment surface of the right-hand bush defines a travel-limit position for the movement of the right-hand shift fork to the right, and
- wherein the third travel-limit element forms a pair of axial abutment surfaces defining a travel-limit position for the movement of the left-hand shift fork to the right and a travel-limit position for the movement of the right-hand shift fork to the left, respectively.

12. A discrete-ratio gearbox for a motor vehicle, comprising a case, at least one rod mounted on the case, at least one sliding shift fork mounted on the at least one rod, and travel-limit means which are provided on the at least one rod for defining travel-limit positions for the at least one shift fork,
- wherein the travel-limit means comprise at least one bush separate from the at least one rod,
- wherein the at least one bush is fixedly mounted on a respective end of the at least one rod and comprises an axially inner portion and an axially outer portion having a larger diameter than the axially inner portion,
- wherein the axially inner portion forms a first axial abutment surface defining a travel-limit position for a first shift fork and
- wherein the axially outer portion forms a second axial abutment surface defining a travel-limit position for a second shift fork.

\* \* \* \* \*